UNITED STATES PATENT OFFICE.

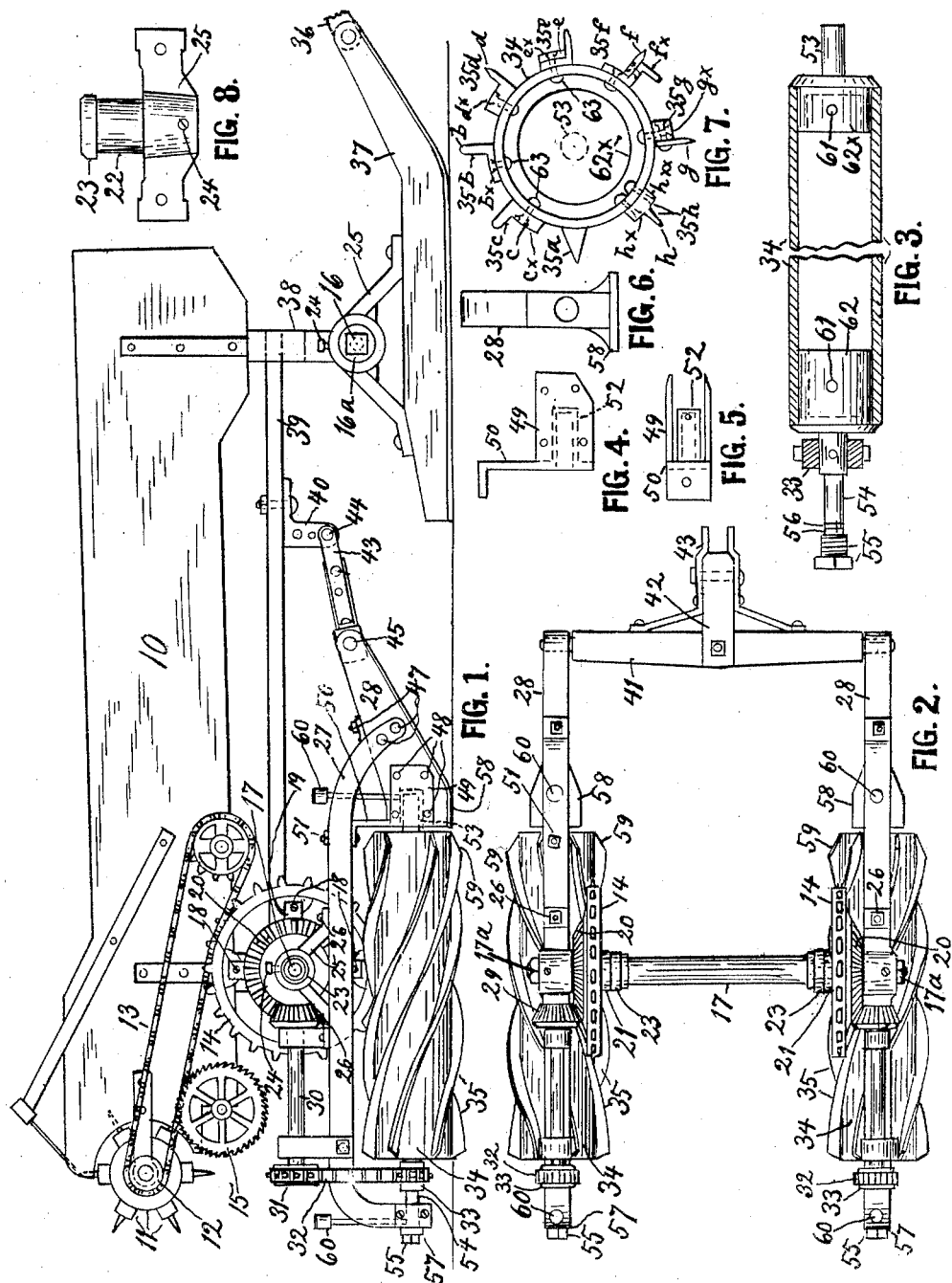

THEOPHIL J. FETCHER, OF NORWALK, WISCONSIN.

MANURE-SPREADER SLEIGH.

1,334,443.   Specification of Letters Patent.   Patented Mar. 23, 1920.

Application filed February 19, 1919. Serial No. 278,001.

*To all whom it may concern:*

Be it known that I, THEOPHIL J. FETCHER, a citizen of the United States, residing at Norwalk, in the county of Monroe and State of Wisconsin, have invented a new and useful Manure-Spreader Sleigh, of which the following is a specification.

My invention relates to manure spreaders and the object is to provide a manure spreader which may readily be operated on ground covered with ice and snow, so that the farmers may utilize the otherwise often idle winter season to spread the manure, and that even more easily than in the seasons of the year when the ground is soft and the manure spreading vehicle is drawn on ground wheels, of which the rear ones are operatively connected with the spreader mechanism. In carrying out my invention I remove from an ordinary manure spreader the supporting wheels and substitute runners, the rear ones of which are provided with spiral ribbed rollers drawn endwise and operatively connected with the regular spreading roller.

In the accompanying drawing:—

Figure 1 is a side elevation of a manure spreader embodying my improvement with the nut 17$^A$ in Fig. 2 omitted. Fig. 2 is a top or plan view of the rear bob in Fig. 1. Fig. 3 is a longitudinal section of one of the spiral winged rollers and the socket secured on it. The spiral wings are omitted and the end plugs and journal are intact. Fig. 4 is a detail side view of one of the front end journal bearings of the spiral rollers. Fig. 5 is a top view of Fig. 4. Fig. 6 is a rear end elevation of one of the wooden portions 28 of the rear runner. Fig. 7 is an enlarged rear end view of a spiral roller with the plug 62 in Fig. 3 removed and showing spiral ribs in several modified forms. Fig. 8 is a top view of one of the knees or brackets of the rear runner and a tapered bushing secured therein as a bearing for the skein of the rear axle of the spreader.

Referring to the drawing by reference numerals, 10 designates the regular box for hauling the manure to be spread by a rotary spreader wheel or cylinder 11, which is mounted across the rear end of the box and is driven by a sprocket 12, endless chain 13 and a comparatively large sprocket 14. The usual movable bottom arrangement in the box 10 and how said bottom is gradually moved by a feed wheel 15 and other parts (not shown), being all of well known construction I need not here further describe the same.

In the snowless season when the axles 16, 17 are supported by the usual ground wheels, the sprocket 14 is secured either to one of the rear ground wheels or to the axle 17 and the latter rotated by one or both of the ground wheels. In the present illustration each sprocket 14 is secured by bolts 18 to flat arms 19 of a bevel gear 20, the latter having an extended hub 21 (see Fig. 2) journaled upon the portion 22 (see Fig. 8) of a skein thimble 23, which is secured by a screw 24 in the knee 25; said knee being bolted at 26 to the upper member 27 of the rear runner 28. The bushings or sleeves 23 may be all of the same size outside but the inside of some of them may be left unfinished so as to bore them to order and thus make them fit axle skeins of different sizes as may be required. 17$^A$ and 16$^A$ are nuts at the ends of the axles.

The bevel gear 20 is rotated by a bevel pinion 29 fixed on a shaft 30 on which is also fixed a sprocket 31, driven by a link belt 32, sprocket 33 and spiral roller 34, whose spiral ribs 35 engage in the snow or in the ice, or both, and cause the roller to rotate as the runners are drawn forward by the pole 36, front runners 37, axle 16, bolster 38, reach 39 and bracket 40. To the said bracket the rear bob 28, 41, 42 is connected by a short reach or link 43, so that the joints 44, 45, allow the rear runners to tilt as may be required on uneven ground. The reach 39 and box 10 are supported on the rear axle by any of the regular means provided for that part of a manure spreader.

The runner head 28 is secured to the raised bar 27 by bolts 47 and also by bolts 48, and a casting 49 having an upward arm 50 secured by a bolt 51. In said casting 49 is formed the bearing or box 52 for the front journal 53 of the roller 34.

In Fig. 3 it is best shown how the rear journal 54 is arranged to wear against the end of a screw 55 and the wear is taken up by small metal disks 56 inserted from time to time between the journal and the screw, so that the head of the screw may always be screwed tight against the bearing 57 and thus be secured against accidental rotation.

The wooden parts 38 of the rear runners are each provided with a broad curved metal plate or shoe 58, which gives the runner that much wearing and bearing surface and also guides the front end of the spiral roller over all obstructions. The front ends of the wings are cut away on a slant as at 59, to make them glide over obstructions on the ground. The numerals 60 designate some of the oil cups from which the different journals are lubricated.

In Fig. 3 is shown how the rollers 34 may be made of common wrought iron pipes and in each end may have secured by a pin 61, a hollow metal plug 62, as parts of the journals 53, 54.

The spiral ribs may be of different numbers on each roller according to its size, and may be of different form in cross section, as shown in Fig. 7, where 35$^a$ indicates a wedge shaped rib preferable to use on a cast roller and cast integral with it. 35$^b$ shows the rib made of common angle steel secured by rivets 63 and having a rounded or dull edge $b$. Rib 35$^c$ is similar but its flange $c$ is extra thick. Rib 35$^d$ is like 35$^c$ but has a sharp edge $d$. Rib 36$^e$ is made of angle steel but the base flange is thickened by a special flat iron bar $e$. Rib 35$^f$ is formed of Z-shaped bar iron or steel, to which is secured a sharp edged strip $f$. The rib 35$^g$ is formed of a square metal bar with a sharp edged strip $g$ secured to it. Rib 35$^h$ is made of T-steel with the leg of the T acting as an ice engaging rib, while the flanges $x$ may be extra thick and serve to press the snow hard, when there is so little snow that the face of the roller cannot reach to compress it, and thus make it more fit to rotate the roller, by engaging the side of the rib $h$ and sometimes also the face HXX. This also explains that on all the forms of ribs shown the sharp edged or nearly sharp edged ribs are designed to engage in ice or icy ground. The faces $b^x$, $c^x$, $d^x$, $e^x$, $f^x$, $g^x$, $h^x$, serve as packers when the snow is thin, and all radial faces of the ribs are for the snow to act on to rotate the roller in the desired direction, and where the snow is deep a part or all of the under side of the roller serves as a runner and also packs the snow, if it is not already hard, so as to give the said radial faces of the ribs that much more chance to rotate the rollers.

When the machine is drawn forward the spiral rollers will thus cause the roller 11 to rotate and spread the manure from the box 10 upon the ground traversed.

When the snowy season is past the rollers may be removed from the axles and the regular supporting wheels replaced if at any time there should be any use for a wheel supported spreader.

What I claim is:—

1. In a manure spreader, the combination with a manure box and a manure spreading beater across the rear end thereof, a front and a rear axle supporting the box and adapted to receive at their ends either supporting wheels or runners, a sprocket near each end of the rear axle, and operative connection between said sprockets and the spreading beater; front runners supporting the skeins of the front axle, and a pair of rear runners supporting the skeins of the rear axle, longitudinally arranged spiral-ribbed rollers journaled one in the base of each rear runner and having operative connection with the said sprockets.

2. The structure specified in claim 1, said axles being connected by bolsters, a reach extending between the bolsters, and a tongue connecting the rear runners to said reach.

3. The structure specified in claim 2, said reach having at its lower side a bracket with vertically spaced perforations, said tongue having a pair of links with a bolt through them adapted to be placed in either of the perforations.

4. The structure specified in claim 1, said operative connection between each spiral roller and the sprocket comprising a bevel gear fixed on the sprocket, a shaft journaled in the part of the runner extending above the spiral roller, a bevel pinion fixed on said shaft and meshing with the bevel gear, a sprocket fixed on the shaft and another sprocket fixed on the spiral roller and an endless link-belt connecting the last mentioned two sprockets.

5. The structure specified in claim 1, said rollers being cylindrical and their spiral ribs having each an edge sharp enough to engage in ice or icy ground.

6. The structure specified in claim 5, said rollers adapted to slide on the snow and compress it so as to give the spiral ribs a better hold when the snow is deep, and said ribs having auxiliary faces beyond the face of the roller for compressing the snow when there is not enough of it to receive pressure from the roller.

7. In a structure of the class described, the rear runners having each the end of its rear journal resisted by a screw and wearing plates between the screw and the journal, the head of the screw being arranged to jam against the journal box so as to thereby be held against accidental rotation.

In testimony whereof I affix my signature.

THEOPHIL J. FETCHER.